United States Patent
Oki et al.

(10) Patent No.: US 12,077,671 B2
(45) Date of Patent: Sep. 3, 2024

(54) INK JET INK COMPOSITION AND RECORDING METHOD

(71) Applicant: Seiko Epson Corporation, Toyko (JP)

(72) Inventors: Yasuhiro Oki, Matsumoto (JP); Daisuke Sakuma, Minowa (JP); Hidehiko Komatsu, Chino (JP); Shintaro Hama, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 240 days.

(21) Appl. No.: 17/215,285

(22) Filed: Mar. 29, 2021

(65) Prior Publication Data

US 2021/0301155 A1  Sep. 30, 2021

(30) Foreign Application Priority Data

Mar. 30, 2020 (JP) ................ 2020-060116

(51) Int. Cl.
*C09D 11/033* (2014.01)
*C08K 5/053* (2006.01)
*C08K 5/06* (2006.01)
*C08K 5/3415* (2006.01)
*C09D 11/328* (2014.01)

(52) U.S. Cl.
CPC ............ *C09D 11/033* (2013.01); *C08K 5/053* (2013.01); *C08K 5/06* (2013.01); *C08K 5/3415* (2013.01); *C09D 11/328* (2013.01)

(58) Field of Classification Search
CPC ..... C09D 11/033; C09D 11/328; C09D 11/38; C09D 11/30; C09D 11/36; C08K 5/053; C08K 5/06; C08K 5/3415
See application file for complete search history.

(56) References Cited

U.S. PATENT DOCUMENTS

| | | | | |
|---|---|---|---|---|
| 6,231,654 B1 * | 5/2001 | Elwakil | ................. | C09D 11/32 106/31.77 |
| 2004/0155946 A1 | 8/2004 | Nagai | | |
| 2006/0065158 A1 * | 3/2006 | Uhlir-Tsang | ........... | C09D 11/38 347/100 |
| 2010/0068476 A1 * | 3/2010 | Jeremic | ................ | C09D 11/101 427/256 |
| 2013/0260036 A1 * | 10/2013 | Shinohara | ............ | C09D 11/322 427/256 |
| 2014/0218451 A1 * | 8/2014 | Iseki | ...................... | C09D 11/38 347/100 |
| 2015/0175825 A1 | 6/2015 | Yamazaki et al. | | |
| 2018/0056691 A1 * | 3/2018 | Arai | ..................... | C09D 11/101 |
| 2018/0111388 A1 * | 4/2018 | Fujita | ................. | B41J 11/00216 |
| 2019/0023926 A1 * | 1/2019 | Kumamoto | .......... | C09D 11/324 |

FOREIGN PATENT DOCUMENTS

| | | |
|---|---|---|
| CN | 1518583 A | 8/2004 |
| CN | 104745004 A | 7/2015 |
| JP | S58-134164 A | 8/1983 |
| JP | 2002-371207 A | 12/2002 |
| JP | 2007045989 A * | 2/2007 |

OTHER PUBLICATIONS

"ECHEMI_1-(2-Hydroxyethyl)-2-pyrrolidinone", ECHEMI, p. 3, accessed Dec. 30, 2022, https://www.echemi.com/sds/hepen-pd2005271004.html (Year: 2019).*
"ThermoFisherScientific_N-Vinyl-2-Pyrrolidone", ThermoFisherScientific, p. 4, accessed Dec. 30, 2022, https://www.fishersci.com/store/msds?partNumber=AC140920050&productDescription=N-VINYL-2-PYRROLIDINONE+5ML&vendorId=VN00032119&countryCode=US&language=en (Year: 2010).*
English machine translation of JP-2007045989-A (Year: 2007).*

* cited by examiner

*Primary Examiner* — Jennifer A Smith
*Assistant Examiner* — Jeffrey Eugene Barzach
(74) *Attorney, Agent, or Firm* — Harness, Dickey & Pierce, P.L.C.

(57) ABSTRACT

An ink jet ink composition contains a color material, an organic solvent, and water. The ink jet ink composition contains N-hydroxyethylpyrrolidone and N-vinyl-2-pyrrolidone as the organic solvent.

7 Claims, No Drawings

INK JET INK COMPOSITION AND RECORDING METHOD

The present application is based on, and claims priority from JP Application Serial Number 2020-060116, filed Mar. 30, 2020, the disclosure of which is hereby incorporated by reference herein in its entirety.

BACKGROUND

1. Technical Field

The present disclosure relates to an ink jet ink composition and a recording method.

2. Related Art

An ink jet method is tried to be applied to not only recording images on recording media but also printing on fabrics, and a variety of ink compositions for ink jet printing have been studied. An ink jet ink composition for printing contains a coloring material for obtaining an image having desired color, and as the color material, dyes and pigments are used. In addition, in also ink jet ink compositions for printing, performance that is the same as or better than that of normal ink jet ink compositions is required.

In an ink jet ink composition, an organic solvent is generally used as a solvent or a dispersant. In an ink jet ink composition, selection of an organic solvent and the blending amount thereof have been broadly investigated in order to obtain desired performance. For example, JP-A-2002-371207 describes that 3-quinuclidinol is used as an organic solvent for dissolving or dispersing a color material and that hydroxyethyl pyrrolidone is used in combination.

However, as the ink disclosed in JP-A-2002-371207, in inks using organic solvents, some combination or blending of organic solvents causes precipitation, solidification, or the like of the color material, and a discharge stability reduction and a clogging recovery failure occur in some cases.

SUMMARY

An aspect of the ink jet ink composition according to the present disclosure is an ink jet ink composition containing a color material, an organic solvent, and water, wherein the ink jet ink composition contains N-hydroxyethylpyrrolidone and N-vinyl-2-pyrrolidone as the organic solvent.

An aspect of the recording method according to the present disclosure includes discharging the ink jet ink composition of the aspect above from an ink jet head to adhere the composition to a recording medium.

DESCRIPTION OF EXEMPLARY EMBODIMENTS

Embodiments of the present disclosure will now be described. The embodiments described below describe examples of the present disclosure. The present disclosure is not limited to the following embodiments and includes various modifications that are implemented within a range not changing the gist of the present disclosure. It should be noted that not all of the configurations described below are essential configurations of the present disclosure.

In the present specification, the term "(meth)acrylic" represents acrylic or methacrylic, and the term "(meth) acrylate" refers to acrylate or methacrylate.

1. INK JET INK COMPOSITION

The ink jet ink composition according to the present embodiment contains a color material, an organic solvent, and water, and contains N-hydroxyethylpyrrolidone and N-vinyl-2-pyrrolidone as the organic solvent. Each component will now be described.

1.1. Color Material

The ink jet ink composition includes a color material. Examples of the color material include a water-soluble dye, a disperse dye, and a pigment, and any of these materials may be used, or a mixture thereof may be used. However, the ink jet ink composition may include a water-soluble dye and may include a water-soluble dye only.

1.1.1. Water-Soluble Dye

The ink jet ink composition of the present embodiment includes a water-soluble dye composed of one or more dyes selected from acid dyes, reactive dyes, and direct dyes. In addition, the water-soluble dye used in the present embodiment is a dye that can dye fabrics (fibers), but the mechanism of dyeing is not particularly limited. Furthermore, the dyes may be used singly or in combination of two or more.

Examples of the acid dye include:

C.I. Acid Red 1, 6, 8, 9, 13, 14, 18, 19, 24, 26, 27, 28, 32, 35, 37, 42, 51, 52, 57, 62, 75, 77, 80, 82, 83, 85, 87, 88, 89, 92, 94, 95, 97, 106, 111, 114, 115, 117, 118, 119, 127, 128, 129, 130, 131, 133, 134, 138, 143, 145, 149, 151, 154, 155, 158, 168, 180, 183, 184, 186, 194, 198, 199, 209, 211, 215, 216, 217, 219, 249, 252, 254, 256, 257, 260, 261, 262, 263, 265, 266, 274, 276, 282, 283, 289, 299, 301, 303, 305, 315, 318, 320, 321, 322, 336, 337, 361, 396, and 397;

C.I. Acid Violet 5, 7, 11, 15, 31, 34, 35, 41, 43, 47, 48, 49, 51, 54, 66, 68, 75, 78, 90, 97, 103, 106, and 126;

C.I. Acid Yellow 1, 3, 7, 11, 17, 19, 23, 25, 29, 36, 38, 39, 40, 42, 44, 49, 50, 59, 61, 64, 70, 72, 75, 76, 78, 79, 98, 99, 110, 111, 112, 114, 116, 118, 119, 127, 128, 131, 135, 141, 142, 143, 151, 159, 161, 162, 163, 164, 165, 169, 174, 184, 190, 195, 196, 197, 199, 207, 218, 219, 222, 227, and 246;

C.I. Acid Blue 1, 7, 9, 15, 22, 23, 25, 27, 29, 40, 41, 43, 45, 49, 54, 59, 60, 62, 72, 74, 76, 78, 80, 82, 83, 87, 90, 92, 93, 100, 102, 103, 104, 106, 112, 113, 114, 117, 120, 126, 127, 127:1, 128, 129, 130, 131, 133, 138, 140, 142, 143, 151, 154, 156, 158, 161, 166, 167, 168, 170, 171, 175, 181, 182, 183, 184, 185, 187, 192, 193, 201, 203, 204, 205, 207, 209, 220, 221, 224, 225, 229, 230, 232, 239, 247, 249, 258, 260, 264, 271, 277, 277:1, 278, 279, 280, 284, 288, 290, 296, 298, 300, 317, 324, 326, 333, 335, 338, 342, and 350;

C.I. Acid Black 1, 2, 7, 24, 26, 29, 31, 44, 48, 50, 51, 52, 52:1, 58, 60, 62, 63, 64, 67, 72, 76, 77, 94, 107, 108, 109, 110, 112, 115, 118, 119, 121, 122, 131, 132, 139, 140, 155, 156, 157, 158, 159, 172, 191, 194, and 234;

C.I. Acid Orange 1, 7, 8, 10, 19, 20, 24, 28, 33, 41, 43, 45, 51, 56, 63, 64, 65, 67, 74, 80, 82, 85, 86, 87, 88, 94, 95, 122, 123, and 124;

C.I. Acid Green 3, 7, 9, 12, 16, 19, 20, 25, 27, 28, 35, 36, 40, 41, 43, 44, 48, 56, 57, 60, 61, 65, 73, 75, 76, 78, and 79; and C.I. Acid Brown 2, 4, 13, 14, 19, 20, 27, 28, 30, 31, 39, 44, 45, 46, 48, 53, 100, 101, 103, 104, 106, 160, 161, 165, 188, 224, 225, 226, 231, 232, 236, 247, 256, 257, 266, 268, 276, 277, 282, 289, 294, 295, 296, 297, 298, 299, 300, 301, and 302.

Examples of the direct dye include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247;

C.I. Direct Violet 7, 9, 47, 48, 51, 66, 90, 93, 94, 95, 98, 100, and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163;

C.I. Direct Blue 1, 10, 15, 22, 25, 41, 55, 67, 68, 71, 76, 77, 78, 80, 84, 86, 87, 90, 98, 106, 108, 109, 120, 151, 156, 158, 159, 160, 153, 168, 189, 192, 193, 194, 199, 200, 201, 202, 203, 207, 211, 213, 214, 218, 225, 226, 229, 236, 237, 244, 248, 249, 251, 252, 264, 270, 280, 288, 289, and 291; and C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 195, and 199.

Examples of the reactive dye include:

C.I. Reactive Yellow 1, 2, 3, 5, 11, 13, 14, 15, 17, 18, 20, 21, 22, 23, 24, 25, 26, 27, 29, 35, 37, 40, 41, 42, 47, 51, 55, 65, 67, 81, 95, 116, 142, and 161;

C.I. Reactive Red 1, 3, 3:1, 4, 13, 14, 17, 19, 21, 22, 23, 24, 24:1, 25, 26, 29, 31, 32, 35, 37, 40, 41, 43, 44, 45, 46, 49, 55, 60, 66, 74, 79, 96, 97, 108, 141, 180, 218, 226, and 245;

C.I. Reactive Violet 1, 3, 4, 5, 6, 7, 8, 9, 16, 17, 22, 23, 24, 26, 27, 33, and 34;

C.I. Reactive Blue 1, 2, 3, 5, 7, 8, 10, 13, 14, 15, 17, 18, 19, 21, 23, 25, 26, 27, 28, 29, 32, 35, 38, 41, 49, 63, 72, 75, 80, 95, and 190;

C.I. Reactive Orange 1, 2, 4, 5, 7, 12, 13, 14, 16, 20, 29, 33, 35, 38, 64, 67, 71, 72, 72:1, 78, 82, 84, 86, 87, 91, 99, 99:1, 107, 113, 122, 124, and 125; and C.I. Reactive Black 1, 3, 4, 5, 7, 8, 11, 12, 14, 17, 21, 23, 26, 31, 32, 34, and 39.

The content of the water-soluble dye based on the total mass of the ink jet ink composition is about 0.1 mass % or more and 30 mass % or less in total and may be 0.5 mass % or more and 25 mass % or less, 1 mass % or more and 20 mass % or less, or 5 mass % or more and 15 mass % or less.

In the ink jet ink composition of the present embodiment, when the water-soluble dye is at least one selected from acid dyes, reactive dyes, and direct dyes, recording media, such as fabrics, can be deeply dyed by using this composition in printing of the recording media.

1.1.2. Disperse Color Material

The ink jet ink composition may use a disperse color material as the color material. The disperse color material is a color material that is not dissolved in a solvent and is, for example, a pigment or a disperse dye. The pigment and disperse dye that are insoluble or slightly soluble in solvents are not particularly limited, and examples thereof include inorganic pigments, organic pigments, oil-soluble dyes, and disperse dyes. In addition, the hues of the pigment and the dye are not limited and may be so-called process color, such as cyan, magenta, yellow, or black, or so-called spot color, such as white, fluorescent, or glitter color.

As the inorganic pigment, for example, carbon black (C.I. Pigment Black 7) pigments, such as furnace black, lamp black, acetylene black, and channel black, metal oxides, titanium oxide, zinc oxide, and silica can be used.

Examples of the carbon black include No. 2300, 900, MCF88, No. 20B, No. 33, No. 40, No. 45, No. 52, MA7, MA8, MA100, and No2200B manufactured by Mitsubishi Chemical Corporation. In addition, examples of the carbon black include Color Black series FW1, FW2, FW2V, FW18, FW200, S150, S160, and S170, Pretex series 35, U, V, and 140U, and Spetial Black series 6, 5, 4A, 4, and 250 manufactured by Degussa Huls AG. Furthermore, examples of the carbon black include Conductex SC and Raven series 1255, 5750, 5250, 5000, 3500, 1255, and 700 manufactured by Columbia Carbon. In addition, examples of the carbon black include REGAL series 400R, 330R, and 660R, MOGUL L, MONARCH series 700, 800, 880, 900, 1000, 1100, 1300, and 1400, and ELFTEX 12 manufactured by Cabot Corporation. Furthermore, examples of the carbon black include BONJET BLACK series CW-1, CW-1S, CW-2, CW-3, and M-800 manufactured by Orient Chemical Industries Co., Ltd.

Examples of the organic pigment include a quinacridone pigment, a quinacridone quinone pigment, a dioxazine pigment, a phthalocyanine pigment, an anthrapyrimidine pigment, an anthanthrone pigment, an indanthrone pigment, a flavanthron pigment, a perylene pigment, a diketopyrrolopyrrole pigment, a perinone pigment, a kinophthalone pigment, an anthraquinone pigment, a thioindigo pigment, a benzimidazolone pigment, an isoindolinone pigment, an azomethine pigment, and an azo pigment.

Examples of the cyan pigment include C.I. Pigment Blue 1, 2, 3, 15:3, 15:4, 15:34, 16, 22, and 60 and C.I. Vat Blue 4 and 60; and the cyan pigment may be, for example, one or a mixture of two or more selected from the group consisting of C.I. Pigment Blue 15:3, 15:4, and 60.

Examples of the magenta pigment include C.I. Pigment Red 5, 7, 12, 48 (Ca), 48 (Mn), 57(Ca), 57:1, 112, 122, 123, 168, 184, and 202 and C.I. Pigment Violet 19, and the magenta pigment may be, for example, one or a mixture of two or more selected from the group consisting of C.I. Pigment Red 122, 202, and 209 and C.I. Pigment Violet 19.

Examples of the yellow pigment include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185, and the yellow pigment may be, for example, one or a mixture of two or more selected from the group consisting of C.I. Pigment Yellow 74, 109, 110, 128, and 138.

Examples of the orange pigment include C.I. Pigment Orange 36 and 43 and mixtures thereof. Examples of the pigment that is used in a green ink jet recording aqueous ink include C.I. Pigment Green 7 and 36 and mixtures thereof.

The glitter pigment is not particularly limited as long as the pigment can glitter when attached to a medium, and examples thereof include metal particles of an alloy (also referred to as metal pigment) of one or more selected from the group consisting of aluminum, silver, gold, platinum, nickel, chromium, tin, zinc, indium, titanium, and copper; and a pearl pigment having pearl luster. Typical examples of the pearl pigment include pigments having pearl luster or interference luster, such as titanium dioxide-coated mica, fish scale flakes, and bismuth acid chloride. In addition, the glitter pigment may be surface-treated for suppressing the reaction with water.

In addition, examples of the white pigment include metal compounds, such as a metal oxide, barium sulfate, and calcium carbonate. Examples of the metal oxide include titanium dioxide, zinc oxide, silica, alumina, and magnesium oxide. In addition, as the white pigment, particles having a hollow structure may be used.

The pigment may be used by being previously dispersed using a dispersant. Examples of the dispersant include (meth)acrylic resins and salts thereof, such as poly(meth) acrylic acid, a (meth)acrylic acid-acrylonitrile copolymer, a (meth)acrylic acid-(meth)acrylic acid ester copolymer, a vinyl acetate-(meth)acrylic acid ester copolymer, a vinyl acetate-(meth)acrylic acid copolymer, and a vinylnaphthalene-(meth)acrylic acid copolymer; styrene resins and salts thereof, such as a styrene-(meth)acrylic acid copolymer, a styrene-(meth)acrylic acid-(meth)acrylic acid ester copolymer, a styrene-α-methylstyrene-(meth)acrylic acid copolymer, a styrene-α-methylstyrene-(meth)acrylic acid-(meth) acrylic acid ester copolymer, a styrene-maleic acid copolymer, and a styrene-maleic anhydride copolymer; and polymer compounds (resins) having a urethane bond between an isocyanate group and a hydroxyl group. These dispersants may be in a straight chain form and/or a branched chain form, and examples thereof include water-soluble resins, such as a urethane resin with or without a crosslinked structure and salts thereof; polyvinyl alcohols; a vinylnaphthalene-maleic acid copolymer and salts thereof; a vinyl acetate-maleic acid ester copolymer and salts thereof; and a vinyl acetate-crotonic acid copolymer and salts thereof.

As commercial products of the dispersant for a styrene-acrylic resin, for example, X-200, X-1, X-205, X-220, and X-228 (manufactured by Seiko PMC Corporation), Nopcosperse (registered trademark) series 6100 and 6110 (manufactured by San Nopco Limited), Joncryl series 67, 586, 611, 678, 680, 682, and 819 (manufactured by BASF SE), DISPERBYK-190 (manufactured by BYK Chemie Japan K.K.), and N-EA137, N-EA157, N-EA167, N-EA177, N-EA197D, N-EA207D, and E-EN10 (manufactured by DKS Co., Ltd.) are mentioned.

Examples of commercial product of the acrylic resin dispersant include BYK-187, BYK-190, BYK-191, BYK-194N, and BYK-199 (manufactured by BYK-Chemie GmbH), and Aron series A-210, A6114, AS-1100, AS-1800, A-30SL, A-7250, and CL-2 (manufactured by Toagosei Co., Ltd.).

Examples of commercial product of the urethane resin dispersant include BYK-182, BYK-183, BYK-184, and BYK-185 (manufactured by BYK-Chemie GmbH), TEGO Dispers 710 (manufactured by Evonic Tego Chemie GmbH), and Borchi (registered trademark) Gen1350 (manufactured by OMG Borchers GmbH).

The dispersants may be used singly or in combination of two or more. The total content of the dispersants may be 0.1 parts by mass or more and 30 parts by mass or less based on 50 parts by mass of the pigment and may be 0.5 parts by mass or more and 25 parts by mass or less, 1 part by mass or more and 20 parts by mass or less, or 1.5 parts by mass or more and 15 parts by mass or less. When the content of the dispersants is 0.1 parts by mass or more based on 50 parts by mass of the pigment, the dispersion stability of the pigment can be further enhanced. In addition, when the content of the dispersants is 30 parts by mass or less based on 50 parts by mass of the pigment, the viscosity of the resulting dispersion can be kept smaller.

In addition, as the disperse dye or the oil-soluble dye, any color material that is dispersed in an ink vehicle without being dissolved therein can be used, and examples thereof include azo, metal complex salt azo, anthraquinone, phthalocyanine, and triarylmethane dyes.

Examples of the disperse dye include C.I. Disperse Red 60, 82, 86, 86:1, 92, 152, 154, 167:1, 191, and 279; C.I. Disperse Yellow 64, 71, 86, 114, 153, 163, 233, and 245; C.I. Disperse Blue 27, 60, 73, 77, 77:1, 87, 165, 165:1, 257, and 367; C.I. Disperse Violet 26, 33, 36, and 57; and C.I. Disperse Orange 30, 41, 61, and 80.

The disperse color material can be stably dispersed in inks. For example, the disperse color material may be used as a self-dispersible color material by oxidizing the color material surface with ozone, hypochlorous acid, fuming sulfuric acid, or the like or by modifying the color material particle surface through sulfonation or may be used by being dispersed by a known dispersant.

The pigments and the disperse dyes exemplified as the disperse color material are merely examples, and these pigments and disperse dyes may be used singly or in combination of two or more, a combination of a pigment and a disperse dye or a combination of a water-soluble dye and a disperse color material can also be used.

1.2. Organic Solvent

The ink jet ink composition of the present embodiment includes an organic solvent. The ink jet ink composition contains N-hydroxyethylpyrrolidone (HEP) and N-vinyl-2-pyrrolidone (NVP) as the organic solvent.

1.2.1. N-Hydroxyethylpyrrolidone (HEP)

N-Hydroxyethylpyrrolidone is called by another name, such as 1-(2-hydroxyethyl)-2-pyrrolidone or 1-(2-hydroxyethyl)pyrrolidin-2-one (in the present specification, may be abbreviated to "HEP"). The HEP is contained in the ink jet ink composition of the present embodiment as an organic solvent.

HEP includes a hydroxyl group and therefore has higher hydrophilicity compared to other organic solvents. Accordingly, the solubility of the water-soluble dye in the ink jet ink composition can be enhanced by containing the HEP, and precipitation and solidification of the water-soluble dye can be prevented from occurring. When the precipitation and the solidification of the water-soluble dye are unlikely to occur, the ink jet ink composition can have excellent discharge stability and clogging recovery. In addition, this effect is particularly significant when the concentration of the water-soluble dye in the ink jet ink composition is high.

The content of the HEP can be 0.5 mass % or more and 30.0 mass % or less based on the total mass of the ink jet ink composition and may be 1.0 mass % or more and 20.0 mass % or less or 5.0 mass % or more and 15.0 mass % or less.

1.2.2. N-Vinyl-2-pyrrolidone (NVP)

N-Vinyl-2-pyrrolidone is called, for example, 1-vinyl-2-pyrrolidone or 1-ethenylpyrrolidin-2-one (in the present specification, may be abbreviated to "NVP"). The NVP is contained in the ink jet ink composition of the present embodiment as an organic solvent.

As described above, the HEP has an excellent function as a solubilizing agent for a dye. However, the HEP has a property of easily increasing the viscosity of the ink jet ink composition. If the viscosity of an ink jet ink composition is increased, when the composition is discharged from an ink jet head, the weight of an ink droplet is decreased to make the discharge unstable in some cases. In the present embodiment, it was found that the discharge property of the ink jet ink composition is improved by containing the NVP.

Although the detailed reason is unclear, it is surmised that when HEP and NVP are present together, the solubilizing property of a dye can be suitably expressed while suppressing the amount of the HEP. As a result, it is inferred that the discharge stability can also be made excellent while adjusting the viscosity of the ink jet ink composition to a value appropriate for discharge from the ink jet head and maintaining the solubility of the dye in the ink jet composition to make the clogging recovery good. In addition, this effect can be obtained even if the content of the NVP is as low as described later.

In addition, when a relatively large amount of a surfactant or an additive is used in the ink jet ink composition, for example, when the disperse color material is used as the color material, if the hydrophilicity of the system is increased, the surfactant or the additive readily precipitates, and so-called oil separation may occur. Since the HEP has high hydrophilicity as described above, there is concern that the oil separation occurs depending on the content. However, since the ink jet ink composition contains the NVP, an effect of lowering the hydrophilicity of the HEP is obtained, and the oil separation can be suppressed. This effect can be obtained even in the content of the NVP is as low as described later.

The content of the NVP can be 0.0001 mass % or more and 0.05 mass % or less based on the total mass of the ink jet ink composition and may be 0.0005 mass % or more and 0.02 mass % or less or 0.001 mass % or more and 0.01 mass % or less.

1.3. Water

The ink jet ink composition according to the present embodiment contains water. Examples of the water include water with low ionic impurities, for example, pure water, such as ion-exchanged water, ultrafiltered water, reverse osmosis water, and distilled water, and ultrapure water. In addition, the use of water sterilized by, for example, UV irradiation or addition of hydrogen peroxide can suppress the outbreak of bacteria or fungi when the ink jet ink composition is stored for a long time.

The content of water can be 30 mass % or more based on the total mass of the ink jet ink composition and may be 40 mass % or more, 45 mass % or more, or 50 mass % or more. The term "water" in the ink jet ink composition includes, for example, the water contained in raw materials and the water to be added. When the content of water is 30 mass % or more, the ink jet ink composition can have a relatively low viscosity. In addition, the upper limit of the content of water can be 90 mass % or less based on the total mass of the ink jet ink composition and may be 85 mass % or less or 80 mass % or less.

1.4. Other Component

The ink jet ink composition of the present embodiment may contain an organic solvent, water, a chelating agent, and other materials.

1.4.1. Other Organic Solvent

The ink jet ink composition of the present embodiment may contain an organic solvent other than the above-mentioned HEP and NVP. Examples of the organic solvent include glycol ether, alkyl polyol, and cyclic amide.

1.4.1.1. Alkyl Polyol

The ink jet ink composition of the present embodiment may include alkyl polyol. The ink jet ink composition including the alkyl polyol can effectively suppress the moisture loss through the recording head when left to stand for a long time while further enhancing the moisture retaining property and making the discharge stability by an ink jet method excellent. In addition, consequently, even if the color material used is a type that is prone to cause nozzle clogging, the recovery after being left and continuous discharge stability can be maintained better.

Examples of the alkyl polyol include 1,2-butanediol, 1,2-pentanediol, 1,2-hexanediol, 1,2-heptanediol, 1,3-propanediol, 1,3-butanediol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, diethylene glycol, propylene glycol, dipropylene glycol, triethylene glycol, and glycerin. These alkyl polyols may be used singly or in combination of two or more.

When the alkyl polyol is contained, the effect can be exhibited when the content is 5 mass % or more based on the total mass of the ink jet ink composition, and the content can be 5 mass % or more and 40 mass % or less and may be 10 mass % or more and 30 mass % or less or 15 mass % or more and 25 mass % or less.

The ink jet ink composition may include, among the alkyl polyols, alkanediol having 3 to 6 carbon atoms. Examples of the alkanediol having 3 to 6 carbon atoms include 1,2-butanediol, 1,2-pentanediol, 1,2-hexanediol, 1,2-heptanediol, 1,3-propanediol, 1,3-butanediol, 1,4-butanediol, 1,5-pentanediol, 1,6-hexanediol, 2-ethyl-2-methyl-1,3-propanediol, 2-methyl-1,3-propanediol, 2,2-dimethyl-1,3-propanediol, 3-methyl-1,3-butanediol, 3-methyl-1,5-pentanediol, and 2-methylpentane-2,4-diol.

In the ink jet ink composition including an alkanediol having 3 to 6 carbon atoms, the viscosity is further reduced, and better discharge stability (continuous discharge reliability) can be obtained. In addition, the solubility and dispersibility of the color material are good, and good clogging recovery can be obtained.

1.4.1.2. Glycol Ether

The ink jet ink composition of the present embodiment may include glycol ether. The glycol ether is, for example, monoalkyl ether or dialkyl ether of glycol selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol. More specifically, examples of the glycol ether include methyl triglycol (triethylene glycol monomethyl ether), butyl triglycol (triethylene glycol monobutyl ether), butyl diglycol (diethylene glycol monobutyl ether), and dipropylene glycol monopropyl ether. A typical example is diethylene glycol monobutyl ether.

The ink jet ink composition may contain, among the glycol ethers, one or more selected from glycol ethers represented by the following formula (1):

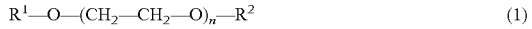
$$R^1—O—(CH_2—CH_2—O)_n—R^2 \quad (1)$$

(in the formula (1), $R^1$ represents H or an alkyl group having 1 to 4 carbon atoms, $R^2$ represents an alkyl group having 1 to 4 carbon atoms, and n represents an integer of 2 or 3).

Examples of the glycol ether represented by the formula (1) include methyl triglycol (triethylene glycol monomethyl ether), butyl triglycol (triethylene glycol monobutyl ether), butyl diglycol (diethylene glycol monobutyl ether), triethylene glycol dimethyl ether, triethylene glycol dibutyl ether, and diethylene glycol dibutyl ether.

A mixture of a plurality of glycol ethers may be used. In addition, when the glycol ether is used, from the viewpoint of adjusting the viscosity of the ink jet ink composition and suppressing clogging by moisturizing effect, the amount thereof is 0.5 mass % or more and 30 mass % or less based on the total mass of the ink jet ink composition and may be 1.0 mass % or more and 20 mass % or less or 3.0 mass % or more and 10.0 mass % or less.

1.4.1.3. Cyclic Amide

The ink jet ink composition of the present embodiment may include cyclic amide. However, since the cyclic amide is similar to the above-described HEP and NVP in the chemical structure, the cyclic amide can be used to the extent that the effects of the HEP and the NVP are not interfered. The cyclic amide has functions of easily dissolving the above-described dyes and suppressing solidification and drying of the ink jet ink composition.

As the cyclic amide, a compound having a ring structure including an amide group is mentioned. Examples of such a compound include γ-lactams, such as 2-pyrrolidone, 1-methyl-2-pyrrolidone (N-methyl-2-pyrrolidone), 1-ethyl-2-pyrrolidone (N-ethyl-2-pyrrolidone), 1-propyl-2-pyrrolidone, and 1-butyl-2-pyrrolidone, β-lactams, δ-lactams, and ε-lactams, such as ε-caprolactam. These cyclic amides may be used singly or in combination of two or more.

1.4.1.4. Other Organic Solvent

The ink jet ink composition of the present embodiment may include an additional organic solvent. Examples of the additional organic solvent include lactones, such as γ-butyrolactone, and betaine compounds.

1.4.2. Other Materials

The ink jet ink composition of the present embodiment may contain a surfactant, a resin particle, a pH adjuster, a chelating agent, a urea, a preservative, a fungicide, a corrosion inhibitor, a saccharide, and other additives, as materials other than the above-mentioned materials.

1.4.2.1. Surfactant

The ink jet ink composition according to the present embodiment may include a surfactant. The surfactant can be used for reducing the surface tension of the ink jet ink composition to adjust or improve the wettability to a recording medium, for example, permeability to a fabric or the like. As the surfactant, any of nonionic surfactants, anionic surfactants, cationic surfactants, and amphoteric surfactants can be used, and further a combination thereof may be used. In particular, among these surfactants, an acetylene glycol surfactant, a silicone surfactant, or a fluorine surfactant may be used.

The acetylene glycol surfactant is not particularly limited, and examples thereof include Surfynol series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, manufactured by Air Products and Chemicals, Inc.), Olfine series B, Y, P, A, STG, SPC, E1004, E1010, PD-001, PD-002W, PD-003, PD-004, PD-005, EXP.4001, EXP.4036, EXP.4051, EXP.4123, EXP.4300, AF-103, AF-104, AK-02, SK-14, and AE-3 (trade names, manufactured by Nissin Chemical Co., Ltd.), and Acetylenol series E00, E00P, E40, and E100 (trade names, manufactured by Kawaken Fine Chemicals Co., Ltd.).

Although the silicone surfactant is not particularly limited, a polysiloxane compound may be used. The polysiloxane compound is not particularly limited, and, for example, polyether modified organosiloxane is mentioned. Examples of commercial product of the polyether modified organosiloxane include BYK-306, BYK-307, BYK-333, BYK-341, BYK-345, BYK-346, and BYK-348 (trade names, manufactured by BYK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

As the fluorine surfactant, a fluorine modified polymer may be used, and examples thereof include BYK-340 (trade name, manufactured by BYK Chemie Japan K.K.).

When surfactants are blended in the ink jet ink composition, the total amount of the surfactants can be 0.01 mass % or more and 3 mass % or less based on the total amount of the ink jet ink composition and may be 0.05 mass % or more and 2 mass % or less, 0.1 mass % or more and 1.5 mass % or less, or 0.2 mass % or more and 1 mass % or less.

In addition, the ink jet ink composition containing a surfactant tends to increase the stability when the ink is discharged from a head.

1.4.2.2. Resin Particle

The ink jet ink composition may contain a resin particle. The resin particle can further improve, for example, the adhesion of the image by the ink jet ink composition adhered to a recording medium. Examples of the resin particle include resin particles made of a urethane resin, an acrylic resin (including a styrene acrylic resin), a fluorene resin, a polyolefin resin, a rosin modified resin, a terpene resin, a polyester resin, a polyamide resin, an epoxy resin, a vinyl chloride resin, a vinyl chloride-vinyl acetate copolymer, or an ethylene vinyl acetate resin. In particular, a urethane resin, an acrylic resin, a polyolefin resin, or a polyester resin may be used. These resin particles are often handled in emulsion form, but may have properties of powder. The resin particles to be used may be one type of particle or a combination of two or more types of particles.

The urethane resin is a generic name of resins having a urethane bond. As the urethane resin, for example, a polyether urethane resin having an ether bond in the main chain in addition to the urethane bond, a polyester urethane resin having an ester bond in the main chain in addition to the urethane bond, or a polycarbonate urethane resin having a carbonate bond in the main chain in addition to the urethane bond may be used. In addition, as the urethane resin, commercial products may be used. For example, SUPERFLEX series 460, 460s, 840, and E-4000 (trade names, manufactured by DKS Co., Ltd.), RESAMINE series D-1060, D-2020, D-4080, D-4200, D-6300, and D-6455 (trade names, manufactured by Dainichiseika Color & Chemicals Mfg. Co., Ltd.), Takelac series WS-5100, WS-6021, and W-512-A-6 (trade names, manufactured by Mitsui Chemicals Polyurethanes, Inc.), Sancure 2710 (trade name, manufactured by The Lubrizol Corporation), and PERMARIN UA-150 (trade name, manufactured by Sanyo Chemical Industries, Ltd.) may be used.

The acrylic resin is a generic name of polymers obtained by polymerizing at least an acrylic monomer, such as (meth)acrylic acid or (meth)acrylic acid ester, as one component, and examples thereof include a resin obtained from an acrylic monomer and a copolymer of an acrylic monomer and another monomer. For example, an acrylic-vinyl resin, which is a copolymer of an acrylic monomer and a vinyl monomer, is mentioned. In addition, for example, styrene is mentioned as the vinyl monomer.

As the acrylic monomer, for example, acryl amide and acrylonitrile can also be used. The resin emulsion using an acrylic resin as a raw material may be a commercial product and may be selected from, for example, FK-854 (trade name, manufactured by Chuo Rika Kogyo Corporation), Movinyl series 952B and 718A (trade names, manufactured by The Nippon Synthetic Chemical Industry Co., Ltd.), and Nipol series LX852 and LX874 (trade names, manufactured by Zeon Corporation).

Incidentally, in the present specification, the acrylic resin may be a styrene-acrylic resin described below. In addition, in the present specification, the notation "(meth)acrylic" means at least one of acrylic and methacrylic.

The styrene-acrylic resin is a copolymer prepared from a styrene monomer and a (meth)acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer. As the styrene-acrylic resin, commercial products may be used. For example, Joncryl series 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF SE), Movinyl series 966A and 975N (trade names, manufactured by The Nippon Synthetic Chemical Industry Co., Ltd.), and Vinylblan 2586 (trade name, manufactured by Nissin Chemical Co., Ltd.) may be used.

The polyolefin resin has olefin, such as ethylene, propylene, or butylene, in the structure skeleton, and an appropriately selected known polyolefin resin can be used. As the olefin resin, commercial products can be used, and for example, Arrowbase series CB-1200 and CD-1200 (trade names, manufactured by Unitika Ltd.) may be used.

In addition, the resin particles may be supplied in emulsion form, and examples of commercial product of such resin emulsion include Microgel series E-1002 and E-5002 (trade names, manufactured by Nippon Paint Co., Ltd., styrene-acrylic resin emulsion), VONCOAT 4001 (trade name, manufactured by DIC Corporation, acrylic resin emulsion), VONCOAT 5454 (trade name, manufactured by DIC Corporation, styrene-acrylic resin emulsion), Polysol series AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate resin emulsion), Polysol series AD-13, AD-2, AD-10, AD-96, AD-17, and AD-70 (ethylene-vinyl acetate resin emulsion), Polysol PSASE-6010 (ethylene-vinyl acetate resin emulsion) (trade names, manufactured by Showa Denko K.K.), SAE1014 (trade name, styrene-acrylic resin emulsion, manufactured by Zeon Corporation), SAIVINOL SK-200 (trade name, acrylic resin emulsion, manufactured by Saiden Chemical Industry Co., Ltd.), AE-120A (trade name, manufactured by JSR Corporation, acrylic resin emulsion), AE373D (trade name, manufactured by Emulsion Technology Co., Ltd., carboxy modified styrene-acrylic resin emulsion), SEIKADYNE 1900W (trade name, manufactured by Dainichiseika Color & Chemicals Mfg. Co., Ltd., ethylene-vinyl acetate resin emulsion), VINYBLAN 2682 (acrylic resin emulsion), VINYBLAN 2886 (vinyl acetate-acrylic resin emulsion), and VINYBLAN 5202 (acetic acid acrylic resin emulsion) (trade names, manufactured by Nissin Chemical Co., Ltd.), Elitel series KA-50715, KT-8803, KT-9204, KT-8701, KT-8904, and KT-0507 (trade names, manufactured by Unitika Ltd., polyester resin emulsion), Hitech SN-2002 (trade name, manufactured by TOHO Chemical Industry Co., Ltd., polyester resin emulsion), Takelac series W-6020, W-635, W-6061, W-605, W-635, and W-6021 (trade names, manufactured by Mitsui Chemicals Polyurethanes, Inc., urethane resin emulsion), SUPERFLEX series 870, 800, 150, 420, 460, 470, 610, and 700 (trade names, manufactured by DKS Co., Ltd., urethane resin emulsion), PERMARIN UA-150 (manufactured by Sanyo Chemical Industries, Ltd., urethane resin emulsion), Sancure 2710 (manufactured by The Lubrizol Corporation, urethane resin emulsion), NeoRez series R-9660, R-9637, and R-940 (manufactured by Kusumoto Chemicals, Ltd., urethane resin emulsion), ADEKA BONTIGHTER series HUX-380 and 290K (manufactured by ADEKA Corporation, urethane resin emulsion), Movinyl 966A and Movinyl 7320 (manufactured by The Nippon Synthetic Chemical Industry Co., Ltd.), Joncryl series 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF SE), NK Binder R-5HN (manufactured by Shin-Nakamura Chemical Co., Ltd.), HYDRAN WLS-210 (non-crosslinkable polyurethane: manufactured by DIC Corporation), and Joncryl 7610 (manufactured by BASF SE).

The content of the resin particles contained in the ink jet ink composition is 0.1 mass % or more and 20 mass % or less as the solid content based on the total mass of the ink jet ink composition and may be 1 mass % or more and 15 mass % or less or 2 mass % or more and 10 mass % or less.

1.4.2.3. Chelating Agent

The ink jet ink composition of the present embodiment may use a chelating agent. The chelating agent can remove a certain ion in the ink jet ink composition.

Examples of the chelating agent include ethylenediaminetetraacetic acid and salts thereof, such as EDTA, EDTA-2Na (disodium dihydrogen ethylenediaminetetraacetate), EDTA-3Na (trisodium hydrogen ethylenediaminetetraacetate), EDTA-4Na (tetrasodium ethylenediaminetetraacetate), and EDTA-3K (tripotassium hydrogen ethylenediaminetetraacetate); diethylenetriaminepentaacetic acid and salts thereof, such as DTPA, DTPA-2Na (disodium diethylenetriaminepentaacetate) and DTPA-5Na (pentasodium diethylenetriaminepentaacetate); nitrilotriacetic acid and salts thereof, such as NTA, NTA-2Na (disodium nitrilotriacetate) and NTA-3Na (trisodium nitrilotriacetate); ethylenediamine-N,N'-disuccinic acid and salts thereof; 3-hydroxy-2,2'-iminodisuccinic acid and salts thereof; L-aspartic-N,N'-diacetic acid and salts thereof; L-glutamic diacetic acid and salts thereof; N-(1-carboxylatomethyl) iminodiacetic acid and salts thereof; and N-(2-hydroxyethyl) iminodiacetic acid and salts thereof.

In addition, examples of the chelating agent other than acetic acid analogues include ethylenediaminetetramethylenephosphonic acid and salts thereof, ethylenediaminetetrametaphosphoric acid and salts thereof, ethylenediaminepyrophosphoric acid and salts thereof, and ethylenediaminemetaphosphoric acid and salts thereof.

When the ink jet ink composition of the present embodiment contains a chelating agent, one or more selected from the above-mentioned chelating agents can be used.

1.4.2.4. pH Adjuster

The ink jet ink composition of the present embodiment can contain a pH adjuster. The pH adjuster is not particularly limited, and examples thereof include an appropriate combination of an acid, a base, a weak acid, and a weak base. Examples of the acid and the base to be used in the combination include inorganic acids, such as sulfuric acid, hydrochloric acid, and nitric acid; inorganic bases, such as lithium hydroxide, sodium hydroxide, potassium hydroxide, potassium dihydrogen phosphate, disodium hydrogen phosphate, potassium carbonate, sodium carbonate, sodium hydrogen carbonate, and ammonia; organic bases, such as triethanolamine, diethanolamine, monoethanolamine, tripropanolamine, triisopropanolamine, diisopropanolamine, and tris(hydroxymethyl)aminomethane (THAM); and organic acids, such as adipic acid, citric acid, succinic acid, and lactic acid. Good's buffers, such as N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), morpholinopropanesulfonic acid (MOPS), carbamoylmethyliminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamide glycine, tricine, glycinamide, and bicine; and phosphate buffer, citrate buffer, Tris buffer, etc. may be used. Furthermore, among these pH adjusters, when a tertiary amine, such as triethanolamine and triisopropanolamine, and a carboxyl group-containing organic acid, such as adipic acid, citric acid, succinic acid, and lactic acid, are contained as a part or the whole of the pH adjuster, a pH buffering effect can be more stably obtained.

1.4.2.5. Ureas

As a moisturizing agent of the ink jet ink composition or as a dyeing assistant for improving the dyeing property of a dye, a urea may be used. Examples of the urea include urea, ethyleneurea, tetramethylurea, thiourea, and 1,3-dimethyl-2-imidazolidinone. When a urea is contained, the content thereof can be 1 mass % or more and 10 mass % or less based on the total mass of the ink jet ink composition.

1.4.2.6. Preservative, Fungicide, and Corrosion Inhibitor

The ink jet ink composition may use a preservative, a fungicide, or a corrosion inhibitor. Examples of the preservative and fungicide include sodium benzoate, sodium pentachlorophenol, sodium 2-pyridinethiol-1-oxide, sodium sorbate, sodium dehydroacetate, 1,2-dibenzisothiazolin-3-one (PROXEL CRL, PROXEL BDN, PROXEL GXL, PROXEL XL-2, PROXEL TN, and PROXEL LV of ZENECA Inc.), and 4-chloro-3-methylphenol (e.g., PREVENTOL CMK of Bayer AG). Examples of the corrosion inhibitor include benzotriazole.

1.4.2.7. Saccharides

In order to suppress the solidification and drying of the ink jet ink composition, a saccharide may be used. Examples of the saccharide include glucose, mannose, fructose, ribose, xylose, arabinose, galactose, aldonic acid, glucitol (sorbitol), maltose, cellobiose, lactose, sucrose, trehalose, and maltotriose.

1.4.2.8. Others

Furthermore, as components other than the above-mentioned components, the ink jet ink composition may contain additives that can be usually used in ink jet ink compositions for ink jet, such as an antioxidant, an UV absorber, an oxygen absorber, and a dissolving assistant.

1.5. Content Ratio Between NVP and HEP

The ink jet ink composition of the present embodiment obtains an effect of dissolving the color material by HEP and also can suppress the increase in viscosity or the enhancement in oil separation due to the HEP by NVP. On this occasion, the NVP can provide a sufficient effect even if the amount thereof is relatively small, as already described.

The ratio of the content of N-hydroxyethylpyrrolidone (HEP) to the content of N-vinyl-2-pyrrolidone (NVP), (the content of HEP)/(the content of NVP), may be, on a mass basis, 200 or more and 20000 or less, 250 or more and 15000 or less, 500 or more and 10000 or less, or 1000 or more and 5000 or less. When the ratio of the contents of HEP and NVP is within the above-mentioned range, better discharge stability and better clogging recovery can be obtained.

1.6. Manufacturing and Physical Properties of Ink Jet Ink Composition

The ink jet ink composition can be obtained by mixing the above-mentioned components in an arbitrary order, performing, for example, filtration as needed, and removing impurities. As the method for the mixing, a method of sequentially adding materials to a container equipped with a stirring device, such as a mechanical stirrer or a magnetic stirrer, and stirring and mixing the materials may be employed. As the method for filtration, for example, centrifugal filtration or filter filtration can be performed as needed.

The ink jet ink composition may have a surface tension of 20 mN/m or more and 40 mN/m or less at 20° C., from the viewpoint of reliability as an ink jet ink, and may have a surface tension of 22 mN/m or more and 35 mN/m or less. In addition, from the same viewpoint, the viscosity of the ink at 20° C. may be 1.5 mPa·s or more and 10 mPa·s or less or 2 mPa·s or more and 8 mPa·s or less. As one approach for adjusting the surface tension and the viscosity within the above-mentioned ranges, for example, the types of the above-described organic solvent and surfactant and the amounts of these components and water are adjusted.

2. RECORDING METHOD

The recording method of the present embodiment uses the above-described ink jet ink composition and includes a step of discharging the ink jet ink composition from an ink jet head to adhere it to a recording medium. The recording medium and the ink jet recording apparatus and the process that can be used in the recording method will now be described.

2.1. Recording Medium

The recording medium is not particularly limited and may be a recording medium having a recording surface that absorbs a liquid or may be a recording medium not having a recording surface that absorbs a liquid. Accordingly, the recording medium is not particularly limited, and, for example, paper, a film, a fabric, a metal, glass, and a polymer can be used. In addition, transfer paper for performing sublimation transfer to a recording medium can also be used as a recording medium for the ink jet printing recording method.

The fabric is not particularly limited. The material constituting the fabric is not particularly limited, and examples thereof include natural fibers, such as cotton, hemp, wool, and silk; synthetic fibers, such as polypropylene, polyester, acetate, triacetate, polyamide, and polyurethane; and biodegradable fibers, such as polylactic acid, and mixed fibers thereof may be used. The fabric may be the above-mentioned fibers in any form, such as woven, knitted, and nonwoven, or may be mixed woven fibers.

2.2. Ink Jet Recording Apparatus

The ink jet recording apparatus to be used may be of a serial type or a line type. In each of the ink jet recording apparatuses of these types, an ink jet head is mounted on, and droplets of the ink jet ink composition are discharged from the nozzle holes of the ink jet head at a predetermined timing and in a predetermined volume (mass) while changing the relative positional relationship between the recording medium and the ink jet head, and thereby the ink jet ink composition adheres to the recording medium to form a predetermined image.

In the ink jet recording apparatus used in the present embodiment, for example, known structures, such as a drying unit, a roll unit, and a winding device, can be arbitrarily adopted. In addition, the ink jet recording apparatus can include, for example, a transport means for transporting a recording medium, an image layer-forming means for recording an image with the ink composition, a drying means, and a whole drying means for performing heating and blowing the recording surface.

The transport means can be constituted of, for example, a roller. In such a case, a plurality of rollers may be included. As another means, for example, a method for transporting a recording medium by adhering or attaching the recording medium to a rubber belt or the like may be used. The position and number of the transport means are arbitrary as long as the recording medium can be transported. The transport means may include a roll mechanism, a tray, various platens, etc.

The image layer-forming means discharges the ink jet ink composition of the present embodiment to the recording surface of a recording medium to record an image layer. The image layer-forming means includes an ink jet head provided with nozzles, and a nozzle line is assigned to each predetermined composition.

The drying means can be used for heating and drying the image layer formed on the recording surface and/or removing the volatile components on the recording medium. The drying means may be provided at any position in consideration of the timing of performing the adhesion step, the transport path of the recording medium, and so on, and any number of drying means may be provided. As an image layer-drying means, a method of applying heat to the recording medium by, for example, heating the platen, a method of blowing the wind to the image on the recording medium, and a method of combining them are mentioned. Specifically, the means to be used in these methods may be, for example, forced air heating, radiation heating, conductive heating, high frequency drying, and microwave drying.

2.3. Each Step of Recording Method

The step of adhering the ink jet ink composition to a recording medium can be performed by using the above-described ink jet recording apparatus. That is, the step of adhering the ink jet ink composition to a recording medium can be performed by filling the ink jet head with the ink jet ink composition such that the composition can be discharged from a predetermined nozzle and discharging the composition in this state to the recording medium at a predetermined timing.

In addition, the recording method of the present embodiment may appropriately include a step of heating a recording medium. The step of heating a recording medium can be performed by, for example, using the above-described drying means when an ink jet recording apparatus is used. In addition, the step can be performed by an appropriate drying means not limited to the ink jet recording apparatus. Consequently, the resulting image is dried to allow the bleeding of the image to be suppressed and the image to be more efficiently fixed.

The recording method of the present embodiment can further appropriately include another step, such as a step of applying another composition or a washing step. In the recording method of the present embodiment, since the above-described ink jet ink composition is used, stable recording can be performed by the good discharge stability and good clogging recovery.

3. EXAMPLES

The present disclosure will now be further specifically described by Examples, but is not limited to these Examples. Hereinafter, "%" is on a mass basis unless otherwise specified.

3.1. Preparation of Ink Jet Ink Composition

Preparation of Ink Jet Ink Compositions of Examples 1 to 16 and Comparative Examples 1 to 3

Ink jet ink compositions according to Examples and Comparative Examples were obtained by putting each of components in respective containers so as to give the compositions shown in Tables 1 and 2, mixing and stirring them with a magnetic stirrer for 2 hours, and then filtering each of the mixtures through a membrane filter with a pore diameter of 5 μm.

Preparation of Ink Jet Ink Compositions of Example 17 and Comparative Example 4

A mixture of 40 g of Pigment Red 122, 10 g of Joncryl 611, 5 g of triethanolamine, and 200 g of ultrapure pure water was dispersed with a ball mill by zirconia beads for 10 hours. The resulting undiluted dispersion was filtered through a membrane filter having a pore diameter of about 8 μm to remove coarse particles, followed by dilution with ultrapure water to a pigment concentration of 10 mass % to prepare a pigment dispersion.

Subsequently, among the materials shown in Table 1, components excluding Pigment Red 122, Joncryl 611, triethanolamine, and water were put in respective containers, and 15 mass % of ultrapure water was further added thereto, followed by stirring and mixing. To each of the mixtures, 40 mass % of the above-described pigment dispersion was added, and water was further added such that the total amount was 100 mass %, followed by stirring for 2 hours. The mixtures were filtered through a membrane filter having a pore diameter of about 5 μm to obtain ink jet ink compositions of Example 17 and Comparative Example 4.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Color material | C.I. Reactive Orange 13 | 10.0 | — | — | — | — | — | — | — | — | — |
| | C.I Reactive Yellow 95 | — | 10.0 | — | — | — | — | 10.0 | 10.0 | — | — |
| | C.I. Reactive Black 5 | — | — | 20.0 | — | — | — | — | — | 20.0 | 20.0 |
| | C.I. Acid Black 172 | — | — | — | 10.0 | — | — | — | — | — | — |
| | C.I. Acid Yellow 79 | — | — | — | — | 5.0 | — | — | — | — | — |
| | C.I. Direct Blue 87 | — | — | — | — | — | 6.0 | — | — | — | — |
| | C.I. Pigment Red 122 | — | — | — | — | — | — | — | — | — | — |
| Dispersant | Joncryl 611 | — | — | — | — | — | — | — | — | — | — |
| Fixing resin | Takelac WS-5100 | — | — | — | — | — | — | — | — | — | — |
| Organic solvent | N-Hydroxy-ethyl-2-pyrrolidone (HEP) | 10.0 | 5.0 | 15.0 | 5.0 | 10.0 | 10.0 | 5.0 | 5.0 | 15.0 | 15.0 |
| | N-Vinyl-2-pyrrolidone (NVP) | 0.004 | 0.005 | 0.003 | 0.005 | 0.005 | 0.002 | 0.01 | 0.02 | 0.0015 | 0.001 |
| | Diethylene glycol monobutyl ether | — | 5.0 | — | 5.0 | — | — | 5.0 | 5.0 | — | — |
| | Triethylene glycol monobutyl ether | 5.0 | — | — | — | — | — | — | — | — | — |
| | 1,3-Butanediol | — | — | — | — | — | — | — | — | — | — |
| | 1,2-Hexanediol | — | — | 3.0 | — | — | — | — | — | 3.0 | 3.0 |
| | 3-Methyl-1,5-pentanediol | — | — | — | — | 5.0 | 5.0 | — | — | — | — |
| | Glycerin | — | — | 3.0 | — | 10.0 | 10.0 | — | — | 3.0 | 3.0 |
| | Propylene glycol | 10.0 | 10.0 | 3.0 | 10.0 | — | — | 10.0 | 10.0 | 3.0 | 3.0 |
| | Triethylene glycol | — | — | — | — | 5.0 | 5.0 | — | — | — | — |
| Surfactant | Olfine E1010 | — | — | — | — | — | — | — | — | — | — |
| | Olfine PD002W | 0.2 | 0.2 | 0.1 | 0.2 | 0.5 | 0.5 | 0.2 | 0.2 | 0.1 | 0.1 |
| | Surfynol 104PG-50 | — | — | — | — | — | — | — | — | — | — |
| pH adjuster | Triethanolamine | — | — | — | 1.0 | 1.0 | 1.0 | — | — | — | — |
| | Triisopropanolamine | 0.3 | 0.2 | 0.1 | — | — | — | 0.2 | 0.2 | 0.1 | 0.1 |
| | Adipic acid | 0.05 | 0.01 | 0.05 | — | — | — | 0.01 | 0.01 | 0.05 | 0.05 |
| Other component | Urea | 3.0 | 3.0 | 5.0 | 3.0 | — | — | 3.0 | 3.0 | 5.0 | 5.0 |
| | EDTA · 2Na | 0.02 | 0.02 | 0.02 | 0.02 | 0.02 | 0.02 | 0.02 | 0.02 | 0.02 | 0.02 |
| | PROXEL XL-2 | 0.2 | 0.2 | 0.2 | 0.2 | 0.2 | 0.2 | 0.2 | 0.2 | 0.2 | 0.2 |
| | Water | Balance | Balance | Balance | Balance | Balance | Balance | Balance | Balance | Balance | Balance |
| | Total | 100.0 | 100.0 | 100.0 | 100.0 | 100.0 | 100.0 | 100.0 | 100.0 | 100.0 | 100.0 |
| | HEP/NVP | 2500 | 1000 | 5000 | 1000 | 2000 | 5000 | 500 | 250 | 10000 | 15000 |
| | Discharge recovery | A | A | A | A | A | A | A | A | A | A |
| | Continuous discharge reliability-(i) | A | A | A | A | A | A | B | C | B | C |
| | Continuous discharge reliability-(ii) | A | A | A | A | A | A | B | C | B | B |

TABLE 2

|  |  | Example | | | | | | | Comparative Example | | | |
|---|---|---|---|---|---|---|---|---|---|---|---|---|
|  |  | 11 | 12 | 13 | 14 | 15 | 16 | 17 | 1 | 2 | 3 | 4 |
| Color material | C.I. Reactive Orange 13 | — | — | — | — | 10.0 | — | — | 10.0 | — | — | — |
|  | C.I Reactive Yellow 95 | 10.0 | — | — | — | — | — | — | — | — | — | — |
|  | C.I. Reactive Black 5 | — | — | — | — | — | — | — | — | — | 20.0 | — |
|  | C.I. Acid Black 172 | — | 10.0 | — | — | — | — | — | — | — | — | — |
|  | C.I. Acid Yellow 79 | — | — | 5.0 | — | — | 5.0 | — | — | — | — | — |
|  | C.I. Direct Blue 87 | — | — | — | 6.0 | — | — | — | — | — | — | — |
|  | C.I. Pigment Red 122 | — | — | — | — | — | — | 4.0 | — | — | — | 4.0 |
| Dispersant | Joncryl 611 | — | — | — | — | — | — | 1.0 | — | — | — | 1.0 |
| Fixing resin | Takelac WS-5100 | — | — | — | — | — | — | 4.0 | — | — | — | 4.0 |
| Organic solvent | N-Hydroxyethyl-2-pyrrolidone (HEP) | 1.0 | 0.5 | 20.0 | 30.0 | 10.0 | 10.0 | 10.0 | — | — | 15.0 | 10.0 |
|  | N-Vinyl-2-pyrrolidone (NVP) | 0.001 | 0.0005 | 0.01 | 0.006 | 0.004 | 0.005 | 0.01 | — | 0.003 | — | — |
|  | Diethylene glycol monobutyl ether | 5.0 | 5.0 | — | — | — | — | — | — | 8.0 | — | — |
|  | Triethylene glycol monobutyl ether | — | — | — | — | — | — | — | 10.0 | — | — | — |
|  | 1,3-Butanediol | — | — | — | — | — | — | — | — | — | — | — |
|  | 1,2-Hexanediol | — | — | — | — | — | — | 2.0 | — | — | 3.0 | 2.0 |
|  | 3-Methyl-1,5-pentanediol | — | — | 5.0 | 5.0 | — | — | — | — | — | — | — |
|  | Glycerin | — | — | 10.0 | 10.0 | — | 10.0 | 15.0 | — | — | 3.0 | 15.0 |
|  | Propylene glycol | 10.0 | 10.0 | — | — | 10.0 | — | — | 10.0 | 10.0 | 3.0 | — |
|  | Triethylene glycol | — | — | 5.0 | 5.0 | — | 5.0 | 5.0 | — | — | — | 5.0 |
| Surfactant | Olfine E1010 | — | — | — | — | — | — | — | — | — | — | 1.0 |
|  | Olfine PD002W | 0.2 | 0.2 | 0.5 | 0.5 | 0.2 | 0.5 | — | 0.2 | 0.2 | 0.1 | — |
|  | Surfynol 104PG-50 | — | — | — | — | — | — | 0.5 | — | — | — | — |
| pH adjuster | Triethanolamine | — | 1.0 | 1.0 | 1.0 | — | 1.0 | 0.5 | — | — | — | 0.5 |
|  | Triisopropanolamine | 0.2 | — | — | — | 0.3 | — | — | 0.3 | 0.2 | 0.1 | — |
|  | Adipic acid | 0.01 | — | — | — | 0.05 | — | — | 0.05 | 0.01 | 0.05 | — |
| Other component | Urea | 3.0 | 3.0 | — | — | 3.0 | — | — | 3.0 | 3.0 | 5.0 | — |
|  | EDTA·2Na | 0.02 | 0.02 | 0.02 | 0.02 | 0.02 | 0.02 | — | 0.02 | 0.02 | 0.02 | — |
|  | PROXEL XL-2 | 0.2 | 0.2 | 0.2 | 0.2 | 0.2 | 0.2 | 0.1 | 0.2 | 0.2 | 0.2 | 0.1 |
|  | Water | Balance | Balance | Balance | Balance | Balance | Balance | Balance | Balance | Balance | Balance | Balance |
|  | Total | 100.0 | 100.0 | 100.0 | 100.0 | 100.0 | 100.0 | 100.0 | 100.0 | 100.0 | 100.0 | 100.0 |
|  | HEP/NVP | 1000 | 1000 | 2000 | 5000 | 250 | 2000 | 1000 | — | — | — | 1000 |
|  | Discharge recovery | B | C | A | A | A | A | A | D | D | A | A |
|  | Continuous discharge reliability-(1) | A | A | B | C | B | B | A | A | A | D | D |
|  | Continuous discharge reliability-(2) | B | B | B | B | B | B | A | A | A | D | D |

In the tables, components described by trade names are as follows.

Joncryl 611: styrene-acrylic acid copolymer (manufactured by BASF Japan Ltd.)

Takelac WS-5100: urethane resin emulsion (manufactured by Mitsui Chemicals Polyurethanes, Inc. Incidentally, the numerical values in the table represent the solid contents.)

Olfine E1010: acetylene glycol surfactant (manufactured by Nissin Chemical Co., Ltd.)

Olfine P002W: acetylene glycol surfactant (manufactured by Nissin Chemical Co., Ltd.)

Surfynol 104PG-50: acetylene glycol surfactant (manufactured by Nissin Chemical Co., Ltd.)

PROXEL XL-2: BIT preservative (manufactured by Lonza Japan Ltd.)

Incidentally, other components used were commercially available products.

3.2. Method of Evaluation

3.2.1. Discharge Recovery

The cyan line of an ink jet printer EW-M770T (manufactured by SEIKO EPSON CORPORATION) was filled with the ink jet ink composition prepared in each Example. Subsequently, cleaning operation was performed, and during the operation (when the ink jet head moved away from the cap section and moved to the printing section), the power cable was unplugged to forcibly stop the operation. The printer was left to stand in this state at ordinary temperature for 2 weeks, and the power cable was then inserted again to turn on the power. Then, the number of cleanings required for normal discharge was counted and was evaluated by the following criteria. The results are shown in the tables.

A: recovered by 4 or less times of cleaning,
B: recovered by 7 or less times of cleaning,
C: recovered by 10 or less times of cleaning, and
D: not recovered by 10 times of cleaning.

3.2.2. Continuous Discharge Stability (1)

An ink jet printing machine Monna Lisa Evo Tre 32-180 (manufactured by SEIKO EPSON CORPORATION) was filled with the ink jet ink composition of each Example, a roll of a pretreated 100% silk fabric (twill: 50 to 60 g/m$^2$, width: 140 cm) was set, and continuous printing was performed with a 600×600 dpi at 2 pass mode. The pretreatment of the silk fabric was performed by applying a pretreatment solution prepared by mixing 1 mass % of sodium alginate, 1 mass % of guar gum, 4 mass % of ammonium sulfate, 10 mass % of urea, and 84 mass % of water to a fabric, squeezing the fabric with a mangle at a pick-up ratio of 20%, and drying it. A nozzle check was performed at every feeding amount of 100 m of the silk fabric to check whether printing was normally performed without omission, bending, and so on and was evaluated by the following criteria. The results are shown in the tables.

A: normal printing was performed for 1000 m or more,
B: normal printing was performed for 500 m or more,
C: normal printing was performed for 200 m or more, and
D: a flight curve occurred within 200 m.

3.2.3. Continuous Discharge Stability (2)

An arbitrary color line (cyan, magenta, yellow, or photo black line) of an ink jet printer EW-M770T (manufactured by SEIKO EPSON CORPORATION) was filled with an ink jet ink composition, printer paper "P" (size A4) manufactured by Fuji Xerox Co., Ltd. was set, and continuous printing was performed at the plain paper/standard mode. A nozzle check was performed every 1000 sheets to verify whether printing was normally performed without omission, bending, and so on and was evaluated by the following criteria. The results are shown in the tables.

A: normal printing was performed for 5000 sheets or more,
B: normal printing was performed for 2500 sheets or more,
C: normal printing was performed for 1000 sheets or more, and
D: a flight curve occurred within 1000 sheets.

3.3. Evaluation Results

It was ascertained that the ink jet ink composition of each Example containing a color material, an organic solvent, and water and containing N-hydroxyethylpyrrolidone (HEP) and N-vinyl-2-pyrrolidone (NVP) as organic solvents showed good discharge stability and good clogging recovery.

The above-described embodiments and modifications are merely examples, and the present disclosure is not limited thereto. For example, it is possible to appropriately combine each embodiment and each modification.

The present disclosure includes configurations that are substantially the same as those described in the embodiments, for example, a configuration having the same function, method, and result or a configuration having the same purpose and effect. In addition, the present disclosure includes configurations in which non-essential parts of the configurations described in the embodiments are replaced. In addition, the present disclosure includes configurations that have the same effects or achieve the same purposes as those of the configurations described in the embodiments. Furthermore, the present disclosure includes configurations in which known techniques are added to the configurations described in the embodiments.

The following contents are derived from the above-described embodiments and modifications.

An aspect of the ink jet ink composition is: an ink jet ink composition containing a color material, an organic solvent, and water, wherein the ink jet ink composition contains: N-hydroxyethylpyrrolidone and N-vinyl-2-pyrrolidone as the organic solvent.

According to this ink jet ink composition, when the color material is a dye, since N-hydroxyethyl-2-pyrrolidone (HEP) is used as a solubilizing agent for the dye, precipitation and solidification of the dye can be suppressed. In addition, since N-vinyl-2-pyrrolidone (NVP) is used in combination, the solubility of the dye is improved, and good discharge stability and good clogging recovery can be obtained.

In addition, according to this ink jet ink composition, when a pigment is used as the color material, as a result of including HEP, the solvent can rapidly penetrate into a recording medium while effectively remaining the pigment on the recording medium. In addition, oil separation in the composition derived from the high hydrophilicity of HEP can be suppressed by including NVP, and good discharge stability and good clogging recovery can be obtained.

In the aspect of the ink jet ink composition, the content of the N-hydroxyethylpyrrolidone may be 1.0 mass % or more and 20.0 mass % or less based on the total mass of the ink jet ink composition.

According to this ink jet ink composition, the viscosity is further suppressed, and better discharge stability (continuous discharge reliability) can be obtained. In addition, the color material solubility and dispersibility are improved, and good clogging recovery can be obtained.

In the aspect of the ink jet ink composition, the ratio of the content of the N-vinyl-2-pyrrolidone to the content of the N-hydroxyethylpyrrolidone, (the content of N-vinyl-2-pyrrolidone)/(the content of N-hydroxyethylpyrrolidone), is 500 or more and 10000 or less on a mass basis.

According to this ink jet ink composition, better discharge stability and better clogging recovery can be obtained.

In the aspect of the ink jet ink composition, as the organic solvent, one or more selected from alkanediol having 3 to 6 carbon atoms and glycol ether represented by the following formula (1) may be contained.

$$R^1\text{—}O\text{—}(CH_2\text{—}CH_2\text{—}O)_n\text{—}R^2 \quad (1)$$

(in formula (1), $R^1$ represents H or an alkyl group having 1 to 4 carbon atoms, $R^2$ represents an alkyl group having 1 to 4 carbon atoms, and n represents an integer of 2 or 3).

According to this ink jet ink composition, the hydrophilicity of the whole ink jet ink composition can be adjusted to a better range by the organic solvent represented by the formula (1) having suppressed hydrophilicity than that of HEP.

In the aspect of the ink jet ink composition, the color material may be a water-soluble dye.

According to this ink jet ink composition, since N-hydroxyethyl-2-pyrrolidone (HEP) is used as a solubilizing agent for the dye, precipitation and solidification of the dye can be suppressed. In addition, since N-vinyl-2-pyrrolidone (NVP) is used in combination, the solubility of the dye is improved, and good discharge stability and good clogging recovery can be obtained.

In the aspect of the ink jet ink composition, the water-soluble dye may be one or more selected from acid dyes, direct dyes, and reactive dyes.

In the aspect of the ink jet ink composition, the content of the water-soluble dye may be 5.0 mass % or more and 20.0 mass % or less based on the total mass of the ink jet ink composition.

According to this ink jet ink composition, even if the content of the color material is larger, discharge stability and clogging recovery can be improved while maintaining good solubility and high color developing property.

An aspect of the recording method includes discharging the ink jet ink composition according to any of the aspects above from an ink jet head and adhering the composition to a recording medium.

According to this recording method, good discharge stability and good clogging recovery can be obtained.

What is claimed is:

1. An ink jet ink composition containing a color material, an organic solvent, and water,
   wherein the ink jet ink composition contains N-hydroxyethylpyrrolidone and N-vinyl-2-pyrrolidone as the organic solvent;
   a content of the water is 40 mass % or more;
   a content of the N-vinyl-2-pyrrolidone is 0.0001 mass % or more and 0.05 mass % or less; and
   a ratio of a content of the N-hydroxyethylpyrrolidone to the content of the N-vinyl-2-pyrrolidone, (content of N-hydroxyethylpyrrolidone)/(content of N-vinyl-2-pyrrolidone), is 500 or more and 10000 or less on a mass basis.

2. The ink jet ink composition according to claim 1, wherein
   a content of the N-hydroxyethylpyrrolidone is 1.0 mass % or more and 20.0 mass % or less based on the total mass of the ink jet ink composition.

3. The ink jet ink composition according to claim 1, wherein
   the ink jet ink composition contains one or more selected from an alkanediol having 3 to 6 carbon atoms and a glycol ether represented by the following formula (1) as the organic solvent, $$R^1\text{—}O\text{—}(CH_2\text{—}CH_2\text{—}O)_n\text{—}R^2 \quad (1)$$

(in the formula (1), $R^1$ represents H or an alkyl group having 1 to 4 carbon atoms, $R^2$ represents an alkyl group having 1 to 4 carbon atoms, and n represents an integer of 2 or 3).

4. The ink jet ink composition according to claim 1, wherein
   the color material is a water-soluble dye.

5. The ink jet ink composition according to claim 4, wherein
   the water-soluble dye is one or more selected from acid dyes, direct dyes, and reactive dyes.

6. The ink jet ink composition according to claim 4, wherein
   a content of the water-soluble dye is 5.0 mass % or more and 20.0 mass % or less based on the total mass of the ink jet ink composition.

7. An ink jet recording method comprising:
   discharging the ink jet ink composition according to claim 1 from an ink jet head to adhere the composition to a recording medium.

\* \* \* \* \*